United States Patent [19]
Cowley et al.

[11] 4,365,864
[45] Dec. 28, 1982

[54] OPTICAL FIBRE MULTIPORT COUPLERS

[75] Inventors: Andrew G. Cowley, Eastleigh; David N. Payne, Southampton; Paul M. Watson, Porchester, all of England

[73] Assignee: National Research Development Corporation, London, England

[21] Appl. No.: 174,444

[22] Filed: Aug. 1, 1980

[30] Foreign Application Priority Data

Aug. 10, 1979 [GB] United Kingdom ............... 7927916

[51] Int. Cl.³ ............... G02B 5/14; G02B 5/16; G02B 5/172
[52] U.S. Cl. ............... 350/96.16; 350/96.15
[58] Field of Search ............... 350/96.15, 96.16, 96.17, 350/96.11, 96.21, 96.22, 97

[56] References Cited
U.S. PATENT DOCUMENTS

| | | | |
|---|---|---|---|
| 3,936,141 | 2/1976 | Milton | 350/96.16 |
| 4,198,118 | 4/1980 | Porter | 350/96.15 X |

FOREIGN PATENT DOCUMENTS

| | | |
|---|---|---|
| 1017354 | 1/1966 | United Kingdom . |
| 1225115 | 3/1971 | United Kingdom . |
| 1497934 | 1/1978 | United Kingdom . |
| 1500257 | 2/1978 | United Kingdom . |
| 1511180 | 5/1978 | United Kingdom . |
| 1558643 | 1/1980 | United Kingdom . |
| 2029046 | 3/1980 | United Kingdom . |

*Primary Examiner*—Marvin L. Nussbaum
*Attorney, Agent, or Firm*—Cushman, Darby & Cushman

[57] ABSTRACT

A star coupler for distributing light from an input optical fibre to one or more output fibres comprises a glass mixer rod interfaced with an optical fibre array and provided with a coating of highly reflective material at the array/mixer rod interface. The coating is provided with apertures which correspond to the fibre core positions such that the coating masks the cladding and interstitial regions of the fibre array. The end face of the mixer rod remote from this interface can be either uniformly mirrored or can be coupled with a second fibre array by a similar reflecting array/mixer rod interface.

14 Claims, 3 Drawing Figures

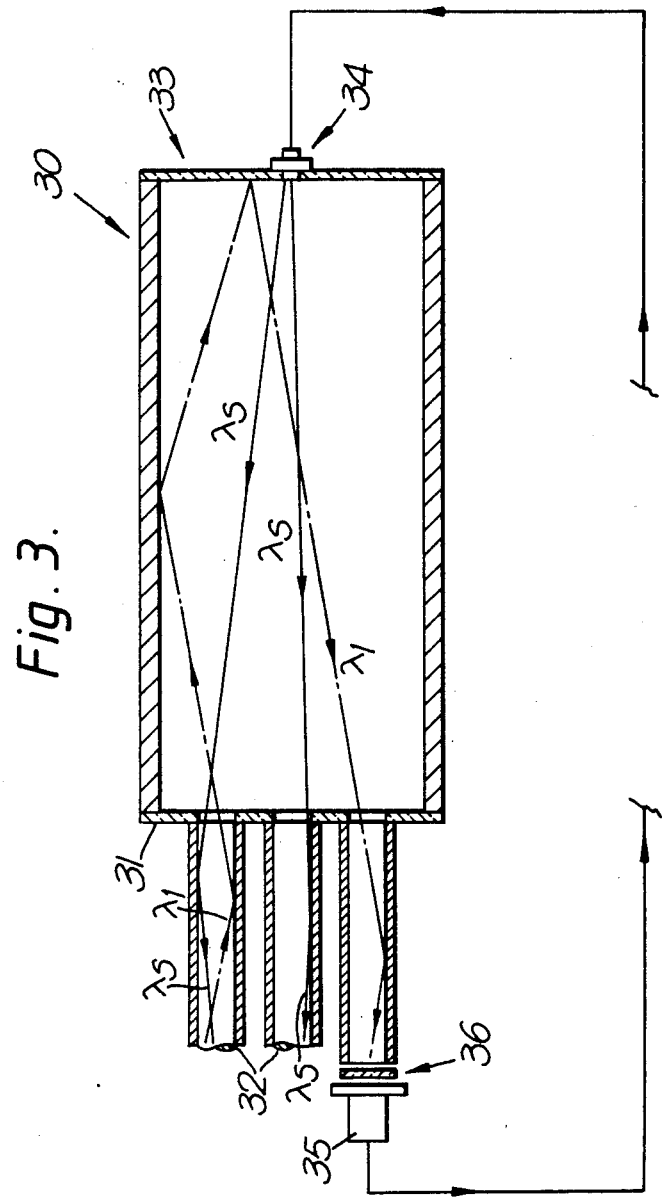

OPTICAL FIBRE MULTIPORT COUPLERS

This invention relates to improvements in optical-fibre multi port-couplers.

In many systems-applications of optical fibres, access couplers and multi way junctions are required to route signals between a number of discrete terminals. Two possible system configurations have been proposed for fibre links of this nature. These are (a) conventional serial-access of series T system and (b) star system.

In contrast with an electrical system, optical fibre systems possess very low cable transmission losses, but suffer relatively high insertion loss at each junction. The advantages and disadvantages of the proposed systems are known, the choice of system configuration chosen depending upon a number of factors. For systems composed of a small number of terminals or for widely dispersed terminals where the cost of the additional cable required for a star system would be prohibitive, a T system may be preferred. However, in most data-bus systems based on optical fibres a star system is indicated, although hybrid systems incorporating both star and T systems may well be the best compromise. This invention concerns particularly star couplers, that is for example a coupler capable of distributing the signal from one terminal equally amongst all the other terminals of the systems.

Star-couplers are well known although those currently in use exhibit relatively high insertion losses. A common form of star coupler employs a mixer-rod to divide and re-transmit the light between the fibres. Conventionally, the mixer-rod consists of a cladded glass rod (similar to a large step index fibre) having a core diameter sufficient to accommodate the input fibres which are grouped together and butted against one end. The rod is totally reflective at the opposite end so that light entering from one or more of the fibres is returned to be distributed amongst all the others. The mixer-rod is of sufficient length to permit adequate mixing, thus ensuring uniform illumination of the fibres and an equi-partition of the light between the terminals. Such star couplers may be referred to as reflective star couplers and use a single fibre to carry bi-directional signals to and from each terminal.

Reflective star couplers have been used in conjunction with multi-fibre bundles for some years. However, the present almost exclusive adoption of single fibres for signal transmission has generated a need for compatible couplers. The use of the conventional couplers described results in relatively high losses. When used for example with single fibres, the major contribution to the optical insertion loss of the star coupler results from the "packing fraction" at the fibre/mixer-rod interface. The packing fraction is defined as the ratio of the fibre core area (which is the only area available to receive light) to the total mixer-rod core area. For a typical seven fibre array incorporating unclad fibres a minimum packing fraction loss of minus 1.09 dB may be achieved, the light being lost only in the interstitial regions between the fibres. In practice however it is preferable that the fibres have a thin integral optical cladding to reduce their scatter and radiation losses. In this case any light-impinging on the cladding areas of the fibres is lost and the packing fraction losses rise dramatically.

It is an object of the invention to provide a coupler which has low optical loss, gives good distribution of power between ports and which is compact in size.

According to the present invention an optical fibre coupler for use with a fibre array comprises a mixer-rod and a layer of highly reflective material located at the fibre array/mixer-rod interface, the layer being non-continuous and containing apertures corresponding to the fibre core positions. The layer of highly reflective material masks the cladding and the interstitial regions of the fibre array.

When the optical fibre coupler of the invention is used to terminate a fibre array the end of the mixer-rod remote from the fibre array is fully coated with a highly reflective material whereas when the coupler is used between two fibre arrays the layer of highly reflective material is non-continuous at each end of the mixer-rod as described above. Light injected into the mixer-rod from one or other of the fibres is reflected back and forth between the reflected layers or coatings until it encounters one of the apertures in the coating through which it escapes. The layer of highly reflective material may conveniently be in the form of a film or coating which is deposited onto the encapsulated and polished ends of the fibre array or, preferably, onto the end of the mixer-rod. In either case the apertures may be defined using conventional photo-resist and etching techniques and employing light transmitted through the fibre cores.

Aluminium is an obvious choice of reflective material since it has high reflectivity in the spectral region of interest and adheres well to glass surfaces. Multi layer dielectric coatings however would be preferable in that they can be made with higher reflectivity than aluminium films, but definition difficulties can be encountered owing to the increased coating thickness (typically 5–10 microns).

A preferred method of producing the non-continuous highly-reflective coating on the mixer-rod comprises depositing the coating, for example aluminium, gold or multi-layer dielectric coating onto the mixer-rod end face, covering this deposited layer with a thin layer of a positive photoresist, butting the prepared fibre optic array end against the resistcoated end face of the mixer-rod, exposing the resist to light transmitted down the fibre cores, removing the mixer-rod, etching the resist to form a mask having apertures corresponding to the positions of the fibre cores and then further etching to remove the reflective coating from within the apertures such that when rejoined to the fibre optic array the mixer-rod is able to accept and transmit from the fibre cores.

An alternative method of defining the apertures within the coating on the mixer-rod uses a negative photoresist. In this case the rod is first coated with a thin layer of photoresist which is then exposed in the normal way by light travelling down the fibre cores. The mixer-rod is removed and the photoresist etched to leave islands of resist at the position of the fibre cores. A reflective coating, for example gold, aluminium or multi-layer dielectric coating is subsequently deposited onto the mixer-rod end-face. The reflective coating is removed to provide apertures for the fibre cores by etching the remaining underlying resist, thus causing the coating to become detached at the appropriate positions.

When the coupler of the invention is to be used between two opposed fibre arrays it is desirable to ensure that the fibre cores occupy less than 50% of the total area of the mixer-rod. This arrangement promotes equal distribution of light amongst the fibres at either end since a large proportion of light will be returned from the apertured reflective coating for distribution to the fibres at the end containing the emitting fibre. The apertures in the reflective coatings at either end of the mixer-rod might be used as emitters or receivers.

In many cases it is economical to distribute light from one emitting source, for example an injection laser or light-emitting diode (LED), to several fibres and thus save on the number of sources required. In such an example it is convenient to use a reflective coupler as previously described with one short fibre being permanently coupled to the emitting source and all other fibres acting only as receiving fibres. Alternatively, the receiving fibre cores are located at one end of the mixer-rod with the emitting source ie a laser or LED and an appropriate aperture at the other end.

In an alternative embodiment of the invention the coupler might preferably include a wavelength selective element whereby light sources of different wavelengths may be preferentially routed between emitter and receiver fibres. In a preferred arrangement a dichroic mirror having the characteristics of reflecting a first wavelength whilst transmitting the second wavelength is provided within the mixer-rod such that the first wavelength is distributed only amongst the fibres on the same side of the mixer-rod as the emitting fibre whereas signals emitted at the second wavelength are coupled to all fibres on both sides of the mixer-rod.

In a further embodiment of the invention there is provided means for boosting or amplifying the light intensity received in the coupler before re-transmission.

In this case the mixer-rod has an array of fibres at one end with a laser or LED source at the other, there being a photo-detector at one or other end of the mixer-rod to receive light from any one of the fibres and means to amplify the signal received and use it to drive the laser or LED source whereafter the source emission is distributed to each of the fibres. Positive feedback of the emitted signal is prevented by emitting light at a slightly different wavelength from that of the incoming signal and by using a dichroic mirror to reflect the light away from the detector. The photo-detector and the dichroic mirror may conveniently be mounted at the end of a short fibre stub which may be butted against an appropriate aperture in the highly reflective coating of the mixer-rod.

Three embodiments of the invention will now be described by way of example only with reference to the accompanying drawings in which:

FIG. 3 is a sectional elevation through a reflective star coupler with means for amplifying an input signal.

Figure 1:
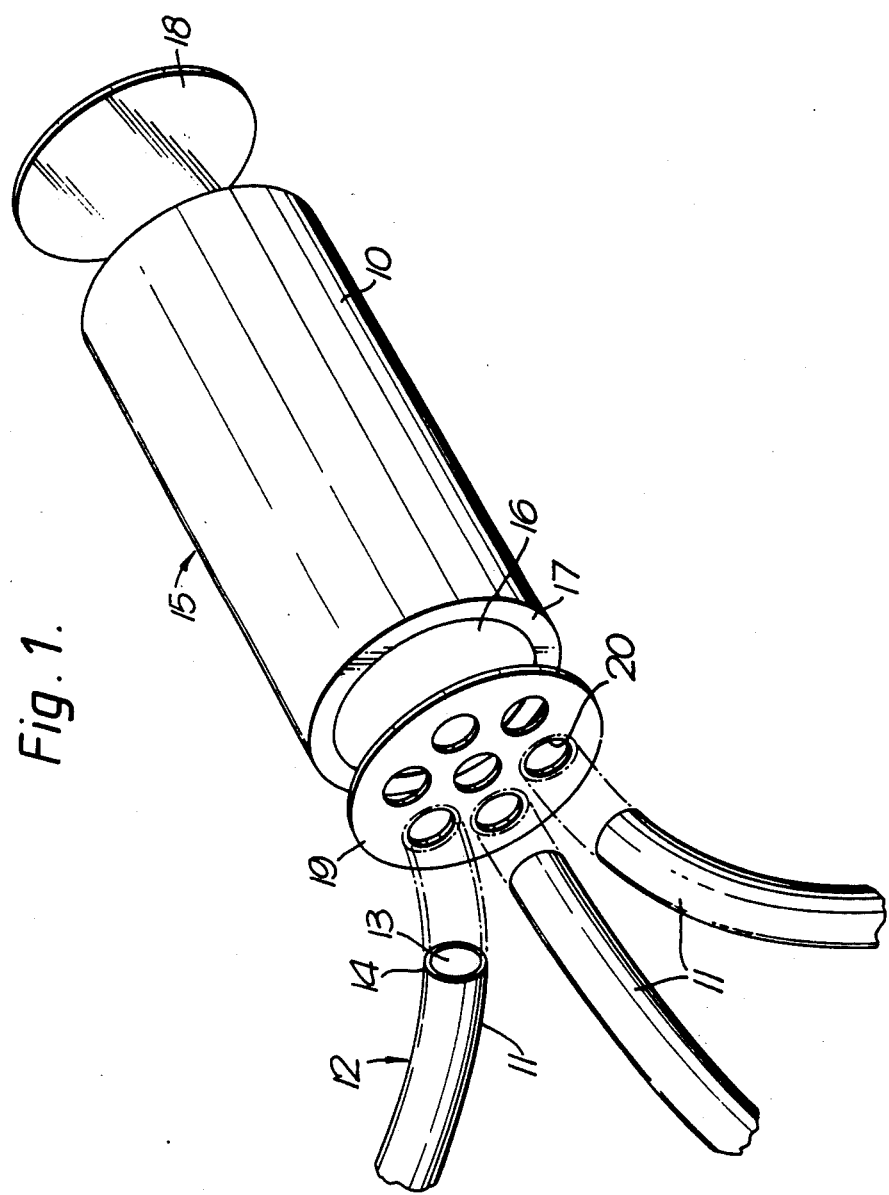
FIG. 1 is an exploded view of the simple reflective star coupler of the invention.

Referring initially to FIG. 1 there is shown a reflective star coupler indicated generally by 10 terminating a fibre array 11 containing seven individual fibres 12 each having a core 13 and cladding 14. For clarity three only of the seven fibres 12 are shown.

The coupler 10 comprises a mixer-rod 15 having a core 16 and cladding 17, a fully reflecting mirror 18 (a continuous layer of highly reflective material) at its end remote from the fibre array 11 and a parallel apertured fully reflecting mirror 19 (a non-continuous layer of highly reflective material) at the mixer-rod 15/fibre array 11 interface.

The apertured mirror 19 contains a series of defined apertures 20 which, in the assembled arrangement, align precisely with the cores 13 of the fibres 12 such that the fibre cladding 14 and the interstitial regions between the fibres 12 are shielded from the mixer-rod 15. The only access into the mixer-rod 15 therefore is through any one of the seven fibre cores 13. The mirrors must be highly parallel such that light entering through a fibre core 13 is reflected back and forth between the full mirror 18 and the apertured mirror 19 until it encounters one of the apertures 20 when it will escape from the mixer-rod 15 and enter a respective fibre core 13.

It is convenient that the apertured mirror 19 should form an integral part of either the fibre array 11 or the mixer-rod 15. It is considered preferable to deposit the reflective coating constituting the apertured mirror 19 onto the mixer-rod 15. A reflective coating such as aluminium, gold or a multi-layered dielectric coating can be deposited on the mixer-rod end face. Aluminium however was chosen as the reflective material, being deposited by the conventional evaporation techniques. A positive photoresist (Shipley AZ 50) was then spun onto the aluminium layer. The fibres 12 of the fibre array 11 were permanently grouped together at the mixer-rod 15 end using an epoxy adhesive and their faces polished to form an input manifold. The manifold was then butted against the resistcoated end of the mixer-rod 15 and the resist exposed using light transmitted down the fibres 12. The mixer-rod 15 was then removed and the resist etched to form a mask having apertures corresponding to the positions of the fibre cores 13. The underlying reflective coating may then be removed from within the apertures by further acid etching, such that when rejoined to the manifold the mixer-rod 15 is able to accept and transmit light from the fibre cores 13. Experiments with both sodium hydroxide and hydrochloric acid etches gave rather nonuniform results and led in both cases to severe undercutting of the aluminium layer. It was discovered however, that the addition of a little hydrofluoric acid to the hydrochloric acid greatly improved the uniformity of the etch. The recipe of ten parts HCl: 1 parts HF: 200 parts $H_2O$ gave an etch rate of approximately 500 Å/min at room temperature. It was found to be preferable to etch the aluminium layer fairly slowly so that accurate end point determination is possible. The latter is necessary since the etch can to some extent attack the glass mixer-rod 15 if care is not taken.

The advantages of the reflective star coupler of the invention are three-fold. Firstly, as previously mentioned, light injected into the mixer-rod 15 from one or other of the fibres 12 is reflected back and forth between the full mirror 18 and the apertured mirror 19 until it encounters one of the apertures 20 in the apertured mirror 19 when it escapes and enters a fibre core 13. In this way the insertion loss of the coupler depends only on the reflectivity of the mirrors 18 and 19 and the loss in the mixer-rod 15 component since light impinging on the fibre claddings 14 and the interstitial regions therebetween is reflected back into the mixer-rod 15. Thus the packing fraction has negligible effect on the insertion loss provided that the mirrors 18, 19 are of high reflectivity and the mixer-rod 15 is of good optical quality. In fact there is no longer a need to close pack the fibres 12 or to match the diameter of the mixer-rod 15 to the fibres 12. A second advantage is that uniform illumination of the fibre cores 13 occurs with a shorter length of mixer-rod 15 than is the case with conventional style couplers because the light experience multiple passes of the rod before being re-launched into one or other of the fibre cores 13. Thus equal distribtion of light between the ports (apertures 20/fibre cores 13) is more easily obtained. A third advantage is that redundant ports (apertures 20) of the coupler 10 may be simply "capped off" while not in use by a removable mirror without increasing the insertion loss. This cap is most conveniently placed at the end of a short length of fibre "pigtail" rather than at the mixer-rod 15 end face. Light then entering this fibre is reflected at the detachable mirror and re-enters the mixer-rod 15, where it is redistributed amongst the fibre cores 13.

The embodiment described above with reference to FIG. 1 has a fibre manifold at one end only, although obviously the same benefits accrue when the coupler has fibres 12 at both ends of the mixer-rod 15. Each end of the mixer-rod 15 is provided with an apertured mirror 19 produced in accordance with the previously described method. In order to promote equal distribution of light amongst the fibres 12 at either end it is desirable to ensure that the fibre cores 13 occupy less than 50% of the total area of the mixer-rod 15. In this way a large proportion of light will be returned from the apertured mirror 19 remote from the source for distribution to the fibre cores 13 at the end which is emitting.

In many cases it is economical to distribute light from one emitting source, for example an injection laser or LED, to several fibres and thus save on the number of sources required. This can be achieved simply by using the star coupler 10 of the invention with one short fibre being permanently coupled to the laser or LED and with all other fibres acting only as receiving fibres. Provided the number of fibres is large, the power returned to the source by the coupler 10 will be an inconsequentially small fraction of the total. An elegant arrangement is to have coupler 10 configuration similar to that of FIG. 1 with the receiving fibres 12 at one end of the mixer-rod 15 and with the laser or LED at the other end and arrange to inject light into the mixer-rod 15 through an aperture (not shown) in the mirror 18. To ensure equal distribution of light amongst the fibres 12 it is desirable to choose carefully the area occupied by the fibre cores 13 relative to the total mixer-rod 15 area such that a substantial proportion of the light experiences multiple reflections between the mirrors 18 and 19.

The fibres 12 can be randomly positioned within the manifold or can be placed in selected positions as for example to form a ring. The cross section of the mixer rod 15, shown in FIG. 1 as circular, could be rectangular or could be formed as a regular polygon such as hexagonal. The choice of cross section for the mixer-rod 15 and the positioning of the fibres 12 in the manifold is made to improve the mixing of light.

Figure 2:
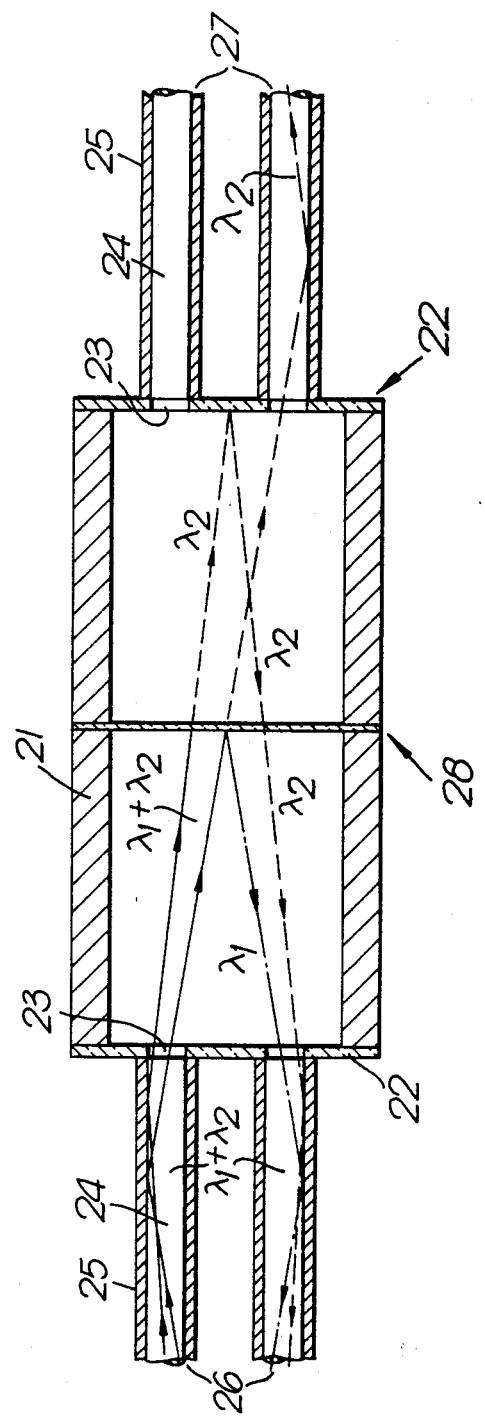
FIG. 2 is a sectional elevational through a star coupler arranged to handle light signals of different wavelength.

Considering now FIG. 2 there is shown an alternative embodiment of the invention whereby it is possible to arrange preferential routing of signals of different wavelengths. The coupler 21 has apertured mirrors 22 at either end, the apertures 23 corresponding with the cores 24 of the individual fibres 25 of fibre arrays 26 and 27. A dichroic mirror 28 is incorporated within the coupler 21, the dichroic mirror 28 having the characteristic of reflecting wavelength $\lambda_1$ while transmitting wavelength $\lambda_2$. The dichroic mirror 28 effectively partitions the fibre arrays 26 and 27 since in use and with for example light of wavelength $\lambda_1$ being emitted through the fibre 25 of the fibre array 26 distribution occurs only amongst those fibres 25 in the array 26 on the same side of the coupler 21. An emitting signal of wavelength $\lambda_2$ however is transmitted through the dichroic mirror 28 and is coupled to all of the fibres 25 of both arrays 26 and 27. Use of wavelength $\lambda_1$ therefore communicates only within the fibre array 26 where use of wavelength $\lambda_2$ permits communication between the fibres 25 of the array 26 and the array 27. Numerous and more complex variations involving two or more wavelengths are obviously possible based on the above scheme.

FIG. 3 shows a star coupler of the invention arranged to provide an amplification of a received light signal prior to its re-transmission to the other fibres of the system. The coupler 30 is similar to the coupler 10 of FIG. 1 having an apertured mirror 31 at one end to receive an array of fibres 32 and an apertured mirror 33 at the other end with a single aperture to receive a suitable laser or LED source 34. Alternatively the laser or LED 34 may be permanently coupled to a short fibre in the array 32.

One of the fibres of the fibre array 32 is a short stub fibre with a photo-detector 35 at its end. Means (not shown) are provided for amplifying electronically light signals falling on the detector 35 and using these amplified signals to drive the light source 34. In use some of the incident light entering the coupler 30 from any one of the fibres of the array 32 falls on the detector 35 and is amplified, the amplified signal drives the light source 34, the emission from which is distributed to each of the fibres of the array 32. Positive feedback of the emitted signal is prevented by re-transmitting the light at a slightly different wavelength from the incident signal and using a dichroic mirror 36 to reflect the emitted source light away from the detector.

In applications where it would be a disadvantage to shift wave-length at the coupler, use may be made of the positive feedback inherent in the coupler to provide pulse reshaping in digital systems. The configuration of the coupler is identical except that the dichroic mirror 36 is omitted and the light source 34 emits at the same wavelength as the incident light. The electrical signal from the photo-detector 35 is reapplied to the light source 34 via an amplifier (not shown) which exhibits a threshold characteristic, and a timing circuit (also not shown). In such a case the detector 35/light source 34 combination forms "an optical monostable" such that incoming signals above the threshold set by the amplifier cause the system to "toggle" into a stable state where the light source 34 is emitting at full power. In this condition the detector 35 receives a proportion of the light emitted by the source 34 and produces a signal which, after amplification, is reapplied to the source thus reinforcing its emitting state. Just as in an electrical monostable, the system is returned to the non-emitting stable state after one bit interval by the timing circuit with an appropriate time constant which drives the light source 34 into the off state, again with the aid of positive feedback. Thus an optical pulse of defined duration having sharp rise and fall times may be produced in response to a relatively weak and distorted input signal.

It will be appreciated that many alternative designs are possible within the broad principle of the invention in which the mixer-rod of the star coupler is provided with apertured mirrors at the fibre/mixer-rod interface. Precise alignment of the fibres with the apertures in the apertured mirrors is of critical importance although this is not considered to be outside the scope of those experienced in the art.

I claim:

1. An optical fibre coupler for use with an array of fibres each including a cladded central core, the coupler including a mixer-rod having a layer of highly reflective material located on a fibre array connection surface on the mixer-rod, the layer being non-continuous, arranged to reflect internally of the mixer-rod and containing apertures corresponding to fibre core positions when the fibre array is coupled.

2. An optical fibre coupler as claimed in claim 1 wherein the mixer-rod has opposed ends which are plane and parallel to each other.

3. An optical fibre coupler as claimed in claim 2 wherein the highly reflective material is in the form of a film or coating which is deposited onto the fibre array connection surface of the mixer-rod, the said surface being highlypolished to receive the reflective material.

4. An optical fibre coupler as claimed in claim 3 for coupling two fibre arrays wherein the mixer-rod has two mutually opposed fibre array connection surfaces each having a respective layer of highly reflective material arranged to reflect internally of the mixer-rod, the layers being non-continuous and each containing apertures corresponding to fibre core positions in the respective array when coupled.

5. An optical fibre coupler as claimed in claim 4 wherein the coupler includes a wavelength selective element whereby light sources of different wavelengths may be preferentially routed from one or more fibres arranged for emission to one or more fibres arranged for reception.

6. An optical fibre coupler as claimed in claim 5 wherein the wavelength selective element is a dichroic mirror having the characteristics of reflecting a first wavelength while transmitting second wavelength provided within the mixer-rod such that the first wavelength is distributed only among fibres in the same array as the emitting fibre, whereas signals emitted at the second wavelength are coupled to fibres in both arrays.

7. An optical fibre coupler as claimed in claim 6 wherein the coupler includes means for boosting or amplifying light intensity received by the coupler from fibres arranged for emission for routing to fibres arranged for reception.

8. An optical fibre coupler as claimed in claim 7 wherein the mixer-rod has an array of fibres at one connection surface and a laser or LED light suorce at the other, there being a photo-detector at one or other end of the mixer-rod to receive light from any one of the fibres and means to amplify the signal received and to use it to drive the laser or LED source whereafter the light suorce emission is distributed to each of the fibres.

9. An optical fibre coupler as claimed in claim 8 wherein light is omitted at a slightly different wavelength to that of the incoming signaland a dichroic mirror is provided to reflect the emitted light away from the detectors.

10. An optical fibre coupler as claimed in claim 9 wherein the photo-detector and the dichroic mirror are mounted at an end of a short fibre stub abutting an appropriate aperture in one of the highly reflective apertured layers.

11. An optical fibre coupler as claimed in claim 1 having one or more highly reflective aluminum layers.

12. An optical fibre coupler as claimed in claim 1 having one or more highly reflective layers of multi-layer dielectric material.

13. An optical fibre coupler according to claim 1 wherein the apertured layer is produced by the steps of:
(1) depositing the highly reflective material, for example aluminum, gold or multi-layer dielectric material, onto a polished mixer-rod end face;
(2) covering the deposited material with a thin layer of a positive photoresist;
(3) butting the fibre optic array cores against the resist-coated end face of the mixer-rod;
(4) exposing the resist to light transmitted down the fibre cores; removing the mixer rod;
(5) etching the resist to form a mask having apertures correspondng to the array positions to the fibre cores; and
(6) further etching to remove the reflective coating from within the apertures such that when rejoined to the fibre optic array the mixer-rod is able to accept light from and transmit light to the fibre cores.

14. An optical fibre coupler according to claim 1 wherein the apertured layer is produced by the steps of:
(1) coating a polished end face of the mixer-rod with a thin layer of photoresist;
(2) exposing the resist to light transmitted down the fibre cores;
(3) removing the mixer-rod and etching the photoresist to leave islands of resist at the array positions of the fibre cores;
(4) depositing a reflective coating, for example gold, aluminum or multi-layer dielectric coating onto the mixer-rod end-face; and
(5) removing the reflective coating to provide layer apertures for the fibre cores for etching the remaining underlying resist, thus causing the coating to become detached at the appropriate positions.

* * * * *